(12) United States Patent
Tavares Miranda

(10) Patent No.: US 10,800,481 B2
(45) Date of Patent: Oct. 13, 2020

(54) MODULAR CRANKSET FOR BICYCLES

(71) Applicant: MIRANDA & IRMAO, LDa, Agueda (PT)

(72) Inventor: Joao Filipe Tavares Miranda, Agueda (PT)

(73) Assignee: MIRANDA & IRMAO, LDa, Agueda (PT)

( * ) Notice: Subject to any disclaimer, the term of this patent is extended or adjusted under 35 U.S.C. 154(b) by 0 days.

(21) Appl. No.: 16/311,586

(22) PCT Filed: Feb. 3, 2017

(86) PCT No.: PCT/EP2017/052455
§ 371 (c)(1),
(2) Date: Dec. 19, 2018

(87) PCT Pub. No.: WO2017/220213
PCT Pub. Date: Dec. 28, 2017

(65) Prior Publication Data
US 2019/0241233 A1 Aug. 8, 2019

(30) Foreign Application Priority Data

Jun. 24, 2016 (WO) ................. PCT/PT2016/050014

(51) Int. Cl.
*B62M 1/36* (2013.01)
*B62M 3/00* (2006.01)
(Continued)

(52) U.S. Cl.
CPC ................ *B62M 1/36* (2013.01); *B62M 3/00* (2013.01); *F16D 1/116* (2013.01);
(Continued)

(58) Field of Classification Search
CPC . B62M 1/36; B62M 3/00; F16D 1/116; F16D 2001/102; F16D 2001/103; F16H 57/0025; B62K 19/34
(Continued)

(56) References Cited

U.S. PATENT DOCUMENTS 648,077 A 4/1900 Ludlow
4,358,967 A 11/1982 Kastan
(Continued)

FOREIGN PATENT DOCUMENTS

DE 10240170 A1 3/2004
EP 1120336 A2 8/2001
(Continued)

OTHER PUBLICATIONS

International Prelimiinary Report on Patentability dated Dec. 25, 2018 for International Application No. PCT/EP2017/052455.
(Continued)

*Primary Examiner* — David H Bollinger
(74) *Attorney, Agent, or Firm* — Lucas & Mercanti, LLP

(57) ABSTRACT

The present patent application describes a modular crankset for bicycles. The described modular crankset is useful for users, since it solves issues related to the speed of replacement of elements, the easiness of the replacement procedures and lowers the weight of the set without compromising the consistency and rigidity of the set. The current technology is applicable to any bicycle available in the market, including electrical bicycles, and it is especially interesting for competition bicycles, wherein the replacement of the constituent elements of the crankset should be made as quickly as possible.

10 Claims, 3 Drawing Sheets

(51) Int. Cl.
    *F16D 1/116*    (2006.01)
    *F16H 57/00*    (2012.01)
    *B62K 19/34*    (2006.01)
    *F16D 1/10*     (2006.01)
(52) U.S. Cl.
    CPC .......... *F16H 57/0025* (2013.01); *B62K 19/34* (2013.01); *F16D 2001/102* (2013.01); *F16D 2001/103* (2013.01)
(58) Field of Classification Search
    USPC .............................................. 74/594.1, 594.2
    See application file for complete search history.

(56)         References Cited

U.S. PATENT DOCUMENTS

| 2006/0288819 | A1* | 12/2006 | Dal Pra' | B62M 3/00 |
| | | | | 74/594.3 |
| 2007/0182122 | A1* | 8/2007 | Smith | B62M 3/00 |
| | | | | 280/256 |
| 2010/0064845 | A1 | 3/2010 | French | |
| 2011/0140390 | A1 | 6/2011 | Kuroiwa et al. | |
| 2012/0042746 | A1* | 2/2012 | Nonoshita | B62M 3/00 |
| | | | | 74/594.2 |
| 2013/0098197 | A1 | 4/2013 | Chen | |
| 2014/0109722 | A1* | 4/2014 | Dal Pra | B62M 3/003 |
| | | | | 74/594.1 |

FOREIGN PATENT DOCUMENTS

| EP | 2230165 | A2 | 9/2010 |
| EP | 2246248 | A1 | 11/2010 |
| ES | 2600778 | A1 | 2/2017 |
| WO | 9503207 | A1 | 2/1995 |
| WO | 2007147909 | A1 | 12/2007 |

OTHER PUBLICATIONS

The International Spline Interface Standard, ISIS Drive, 2001, 18 Pages.
Barrett, "Rotor Introduces New Raptor & Hawk Enduro Cranks", Singletrack Mountain Bike Magazine,2016, Issue 113, 13 pages.
ROTORBikeComponents, "Tippie Rides Rotor's R-Hawk Crank System", Press Release, 2017, 11 pages.
Google search "tretkurbel [= "pedal crank"] spider" of Sep. 29, 2016.
International Search Report and Written Opinion for International Application No. PCT/EP2017/052455 (dated Apr. 18, 2017) (9 Pages).

* cited by examiner

MODULAR CRANKSET FOR BICYCLES

CROSS REFERENCE TO RELATED APPLICATION

This Application is a 371 of PCT/EP2017/052455 filed on Feb. 3, 2017, which, in turn, claimed the priority of International Patent Application No. PCT/PT2016/050014 filed on Jun. 24, 2016, both applications are incorporated herein by reference.

TECHNICAL FIELD

The present patent application describes a modular crankset for bicycles.

BACKGROUND OF THE INVENTION

It is known in the present art the existence of a crankset system that consists of a shaft, a spider or flange, a gear wheel and a crank. Throughout this application, crankset is considered as the set of the previously referred elements. Typically, the shaft, the spider or flange and the crank are fixed by crimping and the wheel is joined to the spider or flange with screws, thus they cannot be easily and quickly separated.

The impossibility of easily and quickly separating them leads to the need of long stops whenever it is necessary to change any of the elements. These changes can be necessary due to the break of any of the elements, for instance due to wear, or due to the need of adjusting any of the elements to the preferences/needs of the user, like for instance changing the chain line, the colour and length of the crank, the gear wheel size or even so as to use the crankset in another bicycle with another crankset support.

Available in the market are some crankset systems which are presented as modular, however its assembly and disassembly process has proved to be extremely complex.

Typically, these systems require the removal of all the bicycle elements to complete the exchange. In these cases, the elements are typically fixed with screws or fitting wheels of the flange with the crank. However, these screws or fitting wheels tend to get damaged with the parts exchange process, which does not happen with the technical solution here presented.

Besides these options, it is also known in the art the existence of modular cranksets wherein the crank is fixed to the spider itself or to the flange with screws or even cases where it is used a spiderless wheel or without flange. In many cases, the spider is crimped to the crank. This often causes lateral play on the chain ring, because the crimping process does not always guarantee full alignment of the spider and the crank. Consequently, the lateral play also needs to be checked and corrected with crimped connections. Furthermore, there is also often a crimped connection between the shaft and the crank. This process may causes deviation on the chain-line.

BRIEF DESCRIPTION

The present application describes a modular crankset comprising a crankset shaft, a gear wheel and a crank, wherein the crankset shaft has an interface shared by the crank and the gear wheel. The gear wheel and the crank are fixed to the crankset shaft with a screw that is fixed at the threaded end of the crankset shaft, wherein the crankset shaft comprises a retaining element.

The gear wheel and the crank are fixed to the crankset shaft by only one screw, which makes the assembly and dismounting of the modular crankset very easy. The gear wheel and the crank are tightly clamped between the screw and the retaining element. Providing an interface on the crank set shaft shared by the crank and the gear wheel allows for a replacement of the crank while the gear wheel remains on the interface. Thus, it is not even necessary to remove the chain from the gear wheel for replacing the crank.

With this new connection technology there is no significant lateral play between the crank and the gear wheel. The proposed interface on the shaft shared by the crank and the gear wheel is produced by CNC machining which can produce an accuracy of approx. 1 μm. This is more than enough to eliminate lateral play. The chain-line is much more stable and straighter due to the machining accuracy. On top of the improved accuracy, the new connection technology eliminates two production steps namely crimping the spider to the crank and crimping the axle to the crank.

In one embodiment, the modular crankset further comprises a spider or flange that carries at least one chain ring, wherein the spider or flange and the at least one chain ring form the gear wheel. In this embodiment, the spider or flange forms the central part of the chain wheel and is fixed to the crankset shaft. The chain ring or chain rings is/are fixed to the spider or flange for example by means of screws. The spider or flange can also carry two or more chain rings.

In another embodiment, the retaining element of the modular crankset is an overthickness of the shaft. An overthickness can easily be formed on the crankset shaft as a collar adjacent to the interface.

The overthickness may have a diameter that is larger or similar to the diameter of the back support of the gear wheel.

In a further embodiment, the retaining element of the modular crankset is an additional part mounted on the shaft.

In one embodiment, the retaining element of the modular crankset is a retaining ring.

In another embodiment, the retaining element of the modular crankset is a retaining screw that passes through the shaft in two holes made for this purpose.

In a yet further embodiment, the screw used in the modular crankset fixed to the threaded end of the crankset shaft features a universal actuator type or an actuator type for a specific wrench. Thus, a standard Allen screw or Torx screw can be used as well as a special screw with an actuator adapted to a unique screwing tool of the manufacturer.

In another embodiment, the modular crankset further comprises a pressure corrugated ring on one side of the gear wheel and a retaining ring on the opposite side of the gear wheel.

In a yet further embodiment, the interface used on the crankset shaft of the modular crankset is an ISIS, mini-ISIS, square taper or another type of interface, wherein the gear wheel and the crank comprise a matching complementary surface. In case of an ISIS interface on the shaft, the gear wheel and the crank both have bores with matching ISIS splines that ensure a non-rotatable connection between the shaft and both the crank and the gear wheel.

Generally, the modular crankset comprises a second crank on the side remote from the gear wheel, wherein the crankset shaft has a second interface on the end remote from the gear wheel engaging a matching complementary interface of the second crank and wherein the width of the interface of the second crank in the direction of the axis of the shaft is larger than the width of the interface of the first crank. Generally, the chainline defined by the lateral distance of the gear wheel from the vertical center plane of the bottom bracket must be strictly observed in order to provide a good transmission of forces and good shifting performance of the front derailleur in case of multiple chain rings on the crankset. The distance of the crank from the central plane of the bicycle is very important for an efficient transmission of the force of the rider. As it is proposed for the first time to share the interface on the shaft between the interfaces on the gear wheel and the adjacent crank, it is also proposed to shorten the width of the spline or interface of the crank adjacent to the gear wheel. This preserves the optimum position of the crank with respect to the center plane of the bicycle. The crank on the opposite end can be a conventional crank with a wider interface. Note that the term width designates the extent of the interface or internal spline of the crank in the lateral direction of the bike rider, i.e. in the direction of the axis of the crankset shaft.

The present application further describes the use of the modular crankset in bicycles, electrical bicycles and competition bicycles.

GENERAL DESCRIPTION

The present application describes a modular crankset for bicycles comprising a crankset shaft, a gear wheel and a crank, wherein the gear wheel and the crank are fixed with the support of a screw that is directly fixed in a threaded end of the crankset shaft and wherein the crankset shaft comprises a retaining element. In some embodiments the modular crankset can further comprise a spider or flange in conjunction with at least one chain ring, forming the gear wheel. So that the fixation of the elements can be done in an effective way, and since the whole crankset is mounted by compression of the screw in relation to the different elements, the shaft should comprise a retaining element, like for instance an overthickness with a diameter that is larger or similar to the back support of the gear wheel working as a stopper. The element is essential to avoid any charge effort in an unusual sense that can lead to the misalignment of the entire set.

Alternatively to the overthickness of the shaft, there can be other embodiments of the retaining element, such as an additional part mounted on the shaft, a retaining ring or even a screw that passes through the shaft in two holes made for this purpose, just to present several different ways of creating this stopper.

The used screw screwed into the threaded end of the shaft can have a universal actuator type like an Allen scew or a Torx screw or an actuator type for a specific wrench on its head, according to the manufacturer's interest.

This crankset has important advantages for the user, since it solves issues related to the speed of replacement of elements, the easiness of the procedure and lowers the weight of the set without compromising the consistency and rigidity of the set. It is important that the modular crankset does not have clearances that create difficulties in the movement transmission between the different elements. The inexistence of clearances is ensured through the striated area found in the interface shared by the shaft, the flange, the gear wheel and the crank. This striated area of the interface is unique and shared by the elements comprising the crankset, thus guaranteeing the full fixation of the system. That is to say, the connection between the elements is similar and the system is fixed by the tightening of the screw in the crank that, on its turn, can touch the flange and this touches the retaining element so the whole system is fixed and rigid without any clearance. The interface used can be anyone which is considered adequate to the efforts required by the type of bicycle used, such as an ISIS (abbreviation of International Spline Interface Standard), mini-ISIS, square taper or others. In the case of crankset supports type BB30, PF30 or 24/24 a pressure corrugated ring can be applied to the shaft and a retaining ring on the opposite side of the gear wheel, to balance the forces and to eliminate the "lateral play" phenomenon which exists in this type of crankset supports.

Besides that, there are other advantages such as the fact that it is a technical solution that involves a significant reduction of the movable elements of the crankset which directly leads to a smaller tendency to the occurrence of wear between the different elements. Another advantage regarding the known art lies in the possibility of fixing again all the elements in case there are clearances in the different elements. In the case of the crankset now presented, it is enough to tighten the screw with the correct torque, while in the known art it is always necessary to make a new interlocking or choose to fully replace the element with clearance. Finally, there are also other advantages in terms of the production and production costs since production stations such as the wheel interlocking with the crank are no longer necessary.

The current technology is applicable to any bicycle available in the market and it is especially interesting for competition bicycles, wherein the replacement of the constituent elements of the crankset should be made as quickly as possible. The current technology can also be applied to electrical bicycles.

BRIEF DESCRIPTION OF THE FIGURES

For a better understanding of the embodiments, the shown figures represent some of those embodiments that should in no way be considered a limitation to the object of the invention.

All figures comprise the following reference numbers:
1a—first crank;
1b—second crank;
2—modular flange or spider;
3—chain ring;
4—shaft;
5—screw;
6—gear wheel;
7—threaded end;
8—retaining element;
9—bicycle frame;
10—striated area.

DETAILED DESCRIPTION OF THE EMBODIMENTS

Next, some embodiments will be described in a more detailed way, but they are not intended to limit the scope of the present invention.

Figure 1:
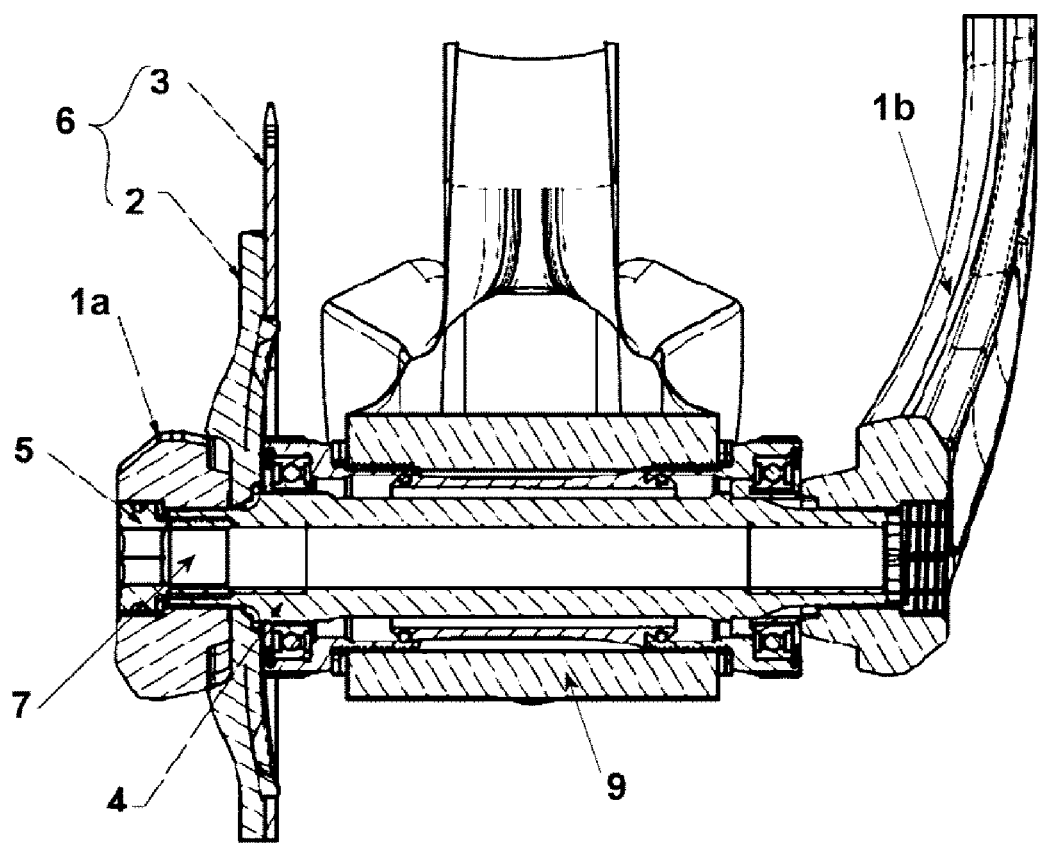
FIG. 1 shows a first embodiment of the modular crankset in a front cut view.
Figure 2:
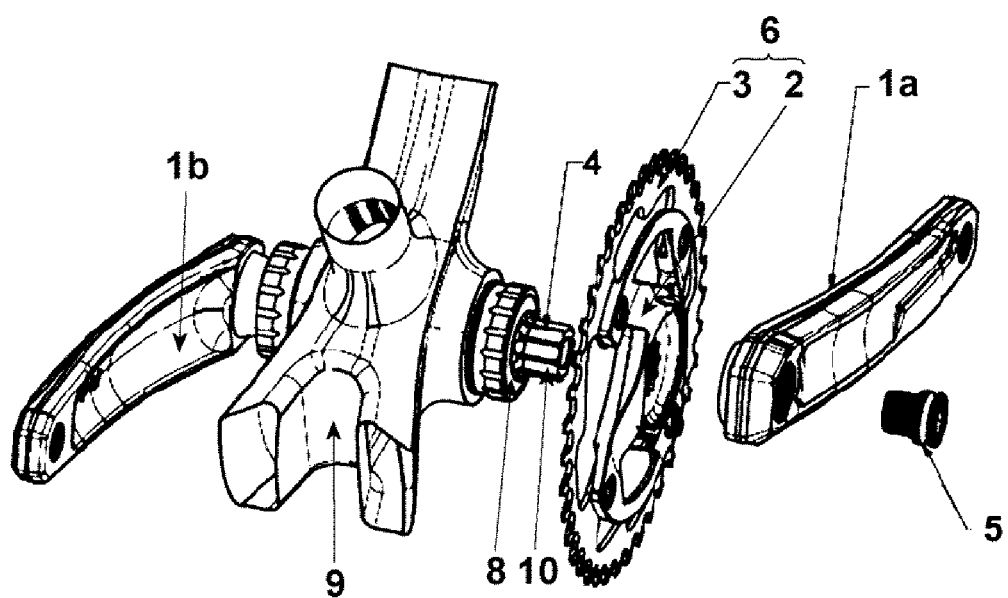
FIG. 2 shows an exploded view of the first embodiment of the modular crankset.

FIGS. 1 and 2 show a first embodiment of the modular crankset. FIG. 1 shows the front cut view of the first embodiment of the modular crankset. The modular crankset comprises a crankset shaft (4), a gear wheel (6) and a first crank (1a) adjacent to the gear wheel (6). The gear wheel (6) comprises two elements, a spider (2) and a chain ring (3).

The shaft (4) is mounted on a bicycle frame (9). The chain ring (3), the spider (2) and the first crank (1a) are mounted on the left end of the shaft (4) as seen in FIG. 1. The shaft (4) has two threaded ends (7). The structural connection of the elements that constitute the modular crankset is ensured by a screw (5) that is directly fixed in the threaded end (7) on the left side (FIG. 1) of the crankset shaft (4). The used screw (5) can have a universal actuator type or an actuator type for a specific wrench on its head, according to the manufacturer's interest. The shaft (4) also comprises a retaining element (8), which is an overthickness of the shaft (4). The crank (1a), the spider (2) and the chain ring (3) are clamped between the screw (5) and the retaining element (8).

In FIG. 1 it can be seen that the screw (5) tightens the set of elements that constitute the modular crankset adjacent to the first crank (1a). As previously explained, it is important that the modular crankset does not have clearances that create difficulties in the movement transmission between the different elements, especially in the relation with the chain ring (3). In order to achieve this goal, there is a striated area (10) or spline providing the connection between the shaft (4), the flange or the modular spider (2) with the chain ring (3)—forming the gear wheel (6)—and the modular crank (1a) (also compare FIG. 2).

This striated area (10) is shared by the elements, guaranteeing the total rigidity of the system.

On the other side of the shaft (4) remote from the gear wheel (6), a second crank (1b) is mounted. The second crank (1b) has an interface with a width in the direction of the axis of the shaft (4) that is larger than the width of the interface of the first crank (1a). The interface of the second crank (1b) abuts against a retaining element (8) at this end of the shaft (4). The fact that the interface on the first crank (1a) is narrower than the interface on the second crank (1b) leads to both cranks having approximately the same distance from the vertical central plane of the bicycle in the ringing direction while conserving the chainline on the chain ring (see FIG. 3).

FIG. 2 shows an exploded view of the first embodiment which shows the absence of any retaining ring between the components. In fact, the modular crankset is made in a way that ensures the approximation between the different elements in a way that enables the absence of these type of elements used in the prior art.

Obviously the technology is in no way limited to the above described embodiments and someone with an average knowledge on the subject can foresee or envisage various modifications within the scope of the appended claims.

Figure 3:
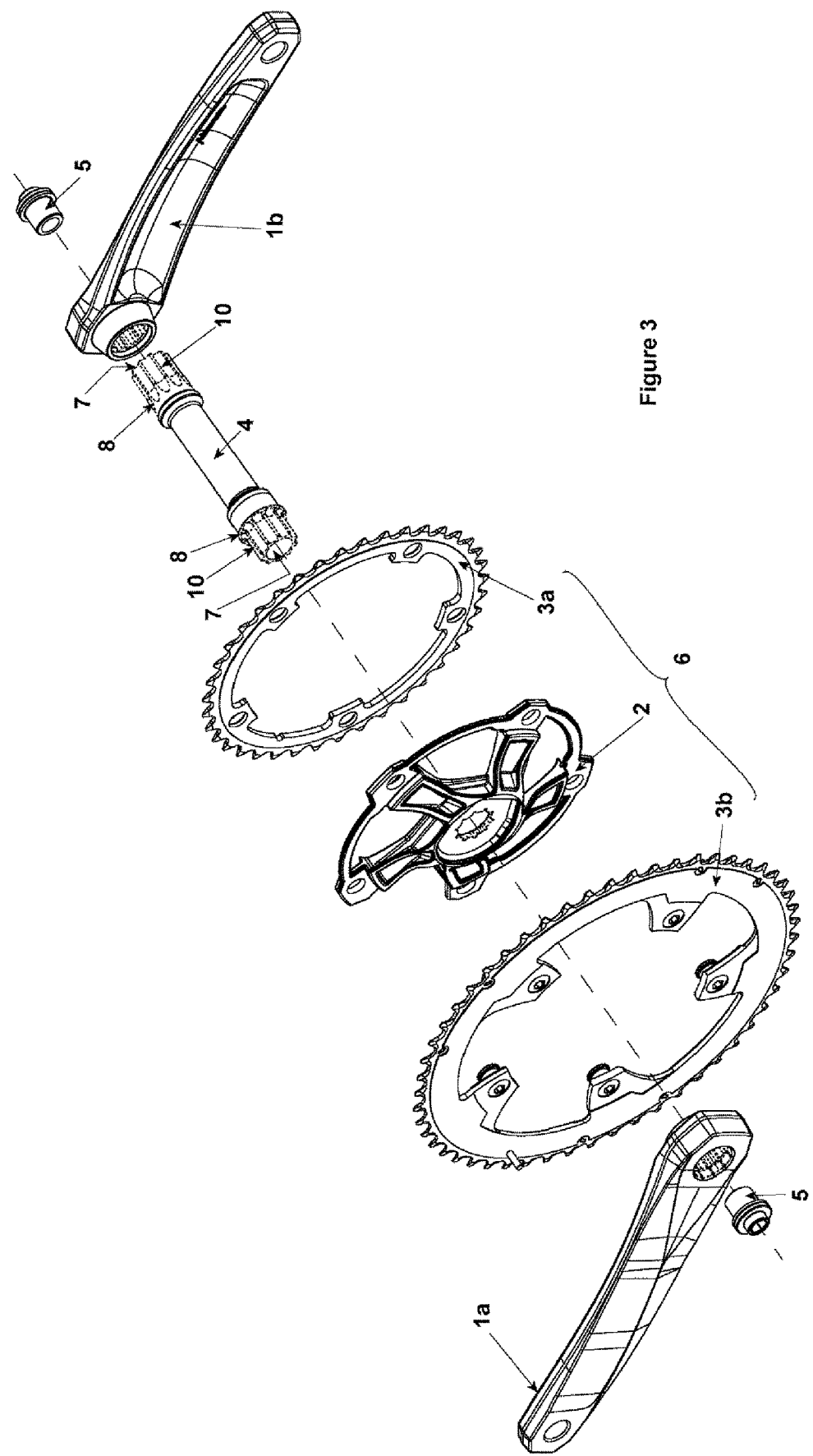
FIG. 3 shows an exploded view of a second embodiment of a modular crankset.

FIG. 3 shows an exploded view of a second embodiment of a modular crankset. The modular crankset comprises a crankset shaft (4) having interfaces in the form of splines or striated areas (10) as well as retaining elements (8) in form of an overthickness on both ends. The shaft (4) also comprises two threaded ends (7) with internal threads on both ends. The striated areas (10) are of an ISIS interface.

On one end of the shaft (4), a gear wheel (6) comprising a first chain ring (3a), a spider (2) and a second chain ring (3b) is mounted. The first chain ring (3a) and the second chain ring (3b) are screwed to the spider (2). The first crank (1a) on the left is mounted to the shaft by means of screw (5). Screw (5) fixes the first crank (1a) and the gear wheel (6) to the shaft (4) by clamping said elements against the retaining element (8).

The first crank (1a) and the spider (2) both have interfaces or internal splines that match the striated area (10) (external splines) on the left end of the shaft (4).

On the right end of the shaft (4) and remote from the gear wheel (6) the second crank (1b) is mounted in a similar manner. As the second crank (1b) does not have to share the interface (10) with a gear wheel, the interface of the second crank (1b) can be larger than the interface of the first crank (1a).

The described embodiments are reconcilable. The following claims define additional embodiments to the current technology.

The invention claimed is:

1. A modular crankset comprising
    a crankset shaft having an elongated body with two ends, a retaining element and a threaded end on each end of the crankset shaft,
    a gear wheel, and
    a first crank,
    wherein the crankset shaft has an interface shared by the first crank and the gear wheel,
    wherein the gear wheel and the first crank are fixed to the crankset shaft with a screw fixed at the threaded end of the crankset shaft.

2. The crankset according to claim 1, further comprising a spider or flange that carries at least one chain ring, wherein the spider or flange and the at least one chain ring form the gear wheel.

3. The crankset according to claim 1, wherein the retaining element is an overthickness of the shaft.

4. The crankset according to claim 3, wherein the overthickness has a diameter that is larger or similar to the diameter of a back support of the gear wheel.

5. The crankset according to claim 1, wherein the retaining element is in the form of a retaining ring.

6. The crankset according to claim 1, wherein the screw fixed at the threaded end of the crankset shaft comprises a universal actuator type or an actuator type for a specific wrench.

7. The crankset according to claim 1, further comprising a pressure corrugated ring on one side of the gear wheel and a retaining ring on the opposite side of the gear wheel.

8. The crankset according to claim 1, wherein the interface on the crankset shaft is an International Spline Interface Standard (ISIS), mini-ISIS or square taper interface, wherein the gear wheel and the crank comprise a matching complementary interface.

9. The crankset according to claim 1, comprising a second crank on the side remote from the gear wheel, wherein the crankset shaft has a second interface on the end remote from the gear wheel engaging a matching complementary interface of the second crank and wherein the width of the interface of the second crank in the direction of the axis of the shaft is larger than the width of the interface of the first crank.

10. Use of the modular crankset, according to claim 1, in bicycles, electrical bicycles and competition bicycles.

* * * * *